United States Patent
Tsuji

(10) Patent No.: US 10,503,282 B2
(45) Date of Patent: Dec. 10, 2019

(54) PEN-TYPE INPUT APPARATUS AND DISPLAY-INPUT SYSTEM

(71) Applicant: KYOCERA Document Solutions Inc., Osaka (JP)

(72) Inventor: Takuya Tsuji, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/884,153

(22) Filed: Jan. 30, 2018

(65) Prior Publication Data
US 2018/0217688 A1    Aug. 2, 2018

(30) Foreign Application Priority Data

Jan. 30, 2017   (JP) ................... 2017-014046

(51) Int. Cl.
   *G06F 3/033*    (2013.01)
   *G06F 3/0354*   (2013.01)
   *G06F 3/041*    (2006.01)

(52) U.S. Cl.
   CPC ........ *G06F 3/03545* (2013.01); *G06F 3/0412* (2013.01); *G06F 3/0416* (2013.01)

(58) Field of Classification Search
   CPC .................................................. G06F 3/03545
   See application file for complete search history.

(56) References Cited

U.S. PATENT DOCUMENTS

| | | | | |
|---|---|---|---|---|
| 2009/0273586 | A1* | 11/2009 | De Haan | G06F 3/03545 345/179 |
| 2014/0055427 | A1* | 2/2014 | Kim | G06F 3/03545 345/179 |
| 2014/0132542 | A1* | 5/2014 | Lipman | G06F 3/0488 345/173 |
| 2015/0177905 | A1* | 6/2015 | Mok | G06F 3/03545 345/179 |
| 2017/0131802 | A1* | 5/2017 | Yeh | G06F 3/03545 |

FOREIGN PATENT DOCUMENTS

| | | |
|---|---|---|
| JP | 2009-015728 A | 1/2009 |
| KR | 10-2014-0145480 | 12/2014 |

OTHER PUBLICATIONS

Japan Patent Office. Office Action of foreign counterpart, dated Apr. 16, 2019.

* cited by examiner

*Primary Examiner* — Roy P Rabindranath
(74) *Attorney, Agent, or Firm* — Hawaii Patent Services; Nathaniel K. Fedde; Kenton N. Fedde

(57) ABSTRACT

Provided is technology that makes it easy to select a format for inputting drawings or characters when inputting to a display apparatus such as a tablet or the like using a touch pen. A display-input system includes a tablet, and a touch pen as an input unit for the tablet. The tablet and touch pen are capable of linked operation by communicating with each other. Contents (input-format-selection screen) that are the same as a palette of the tablet are displayed on a pen-side touch panel of the touch pen so that selection is possible. A format that is selected by a user operating the pen-side touch panel is reflected on an application that is being executed by the tablet, and reflected on the application in the same way as direct operation on the tablet.

6 Claims, 9 Drawing Sheets

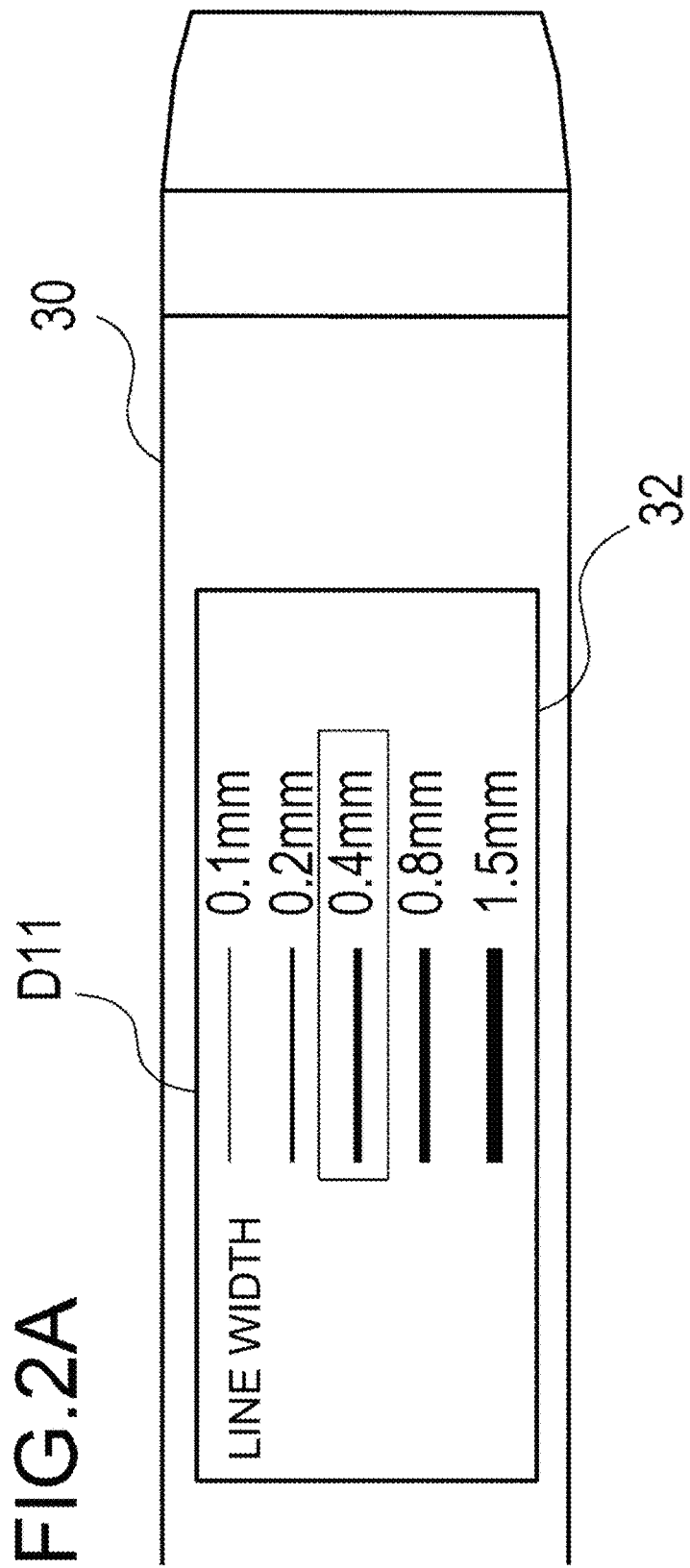

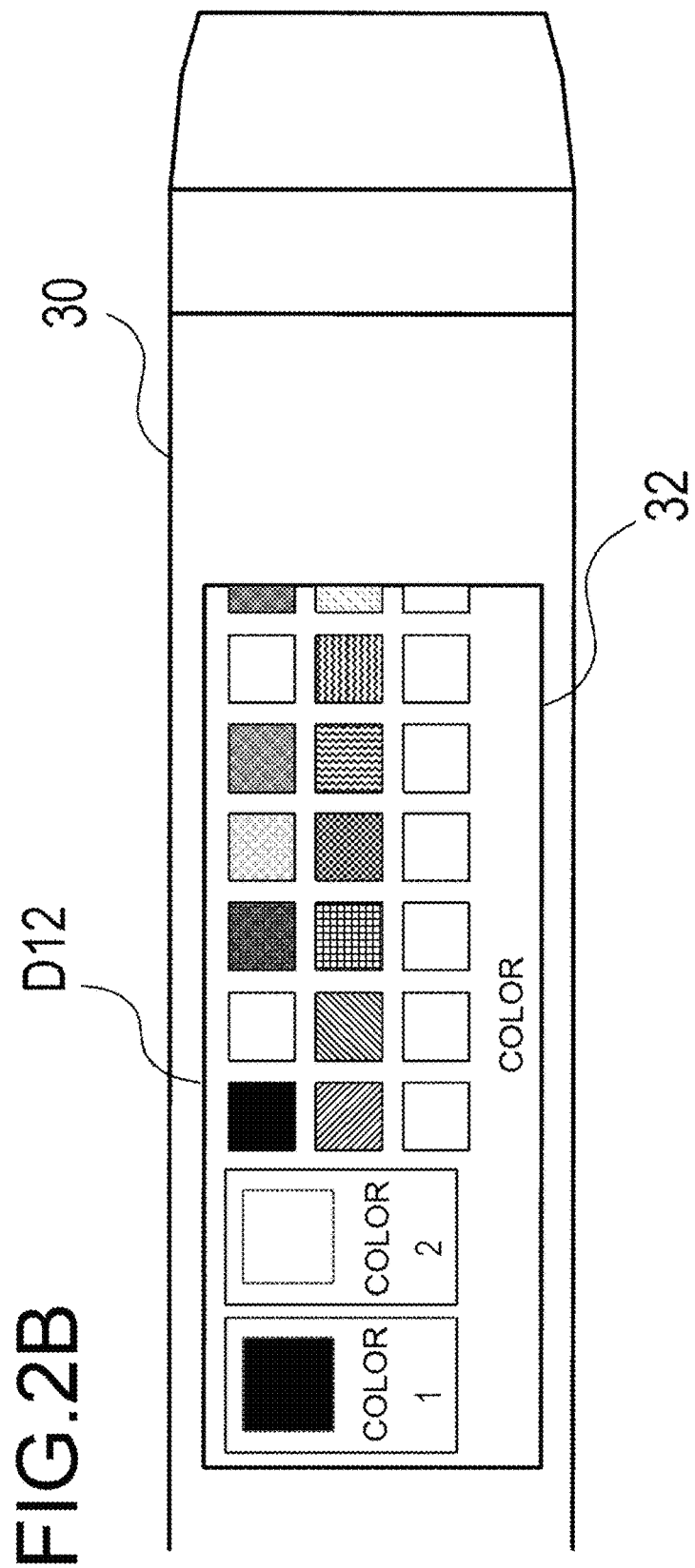

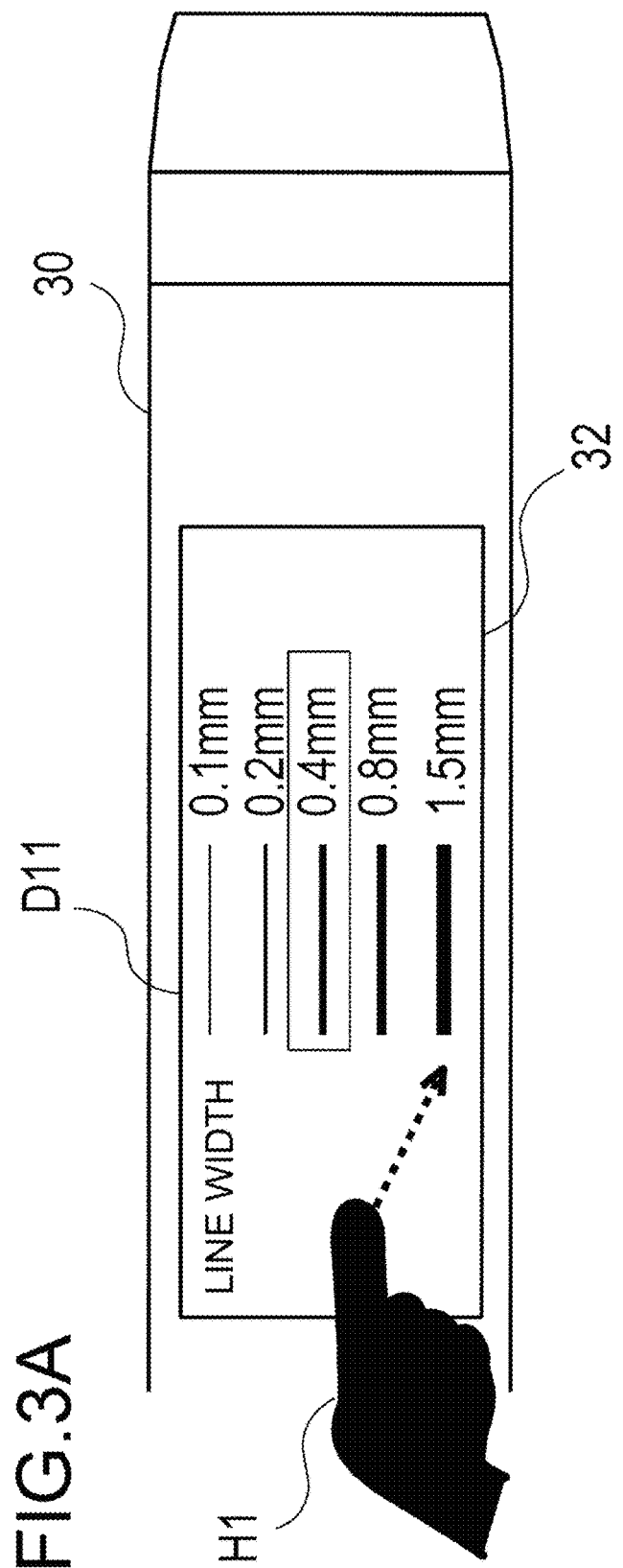

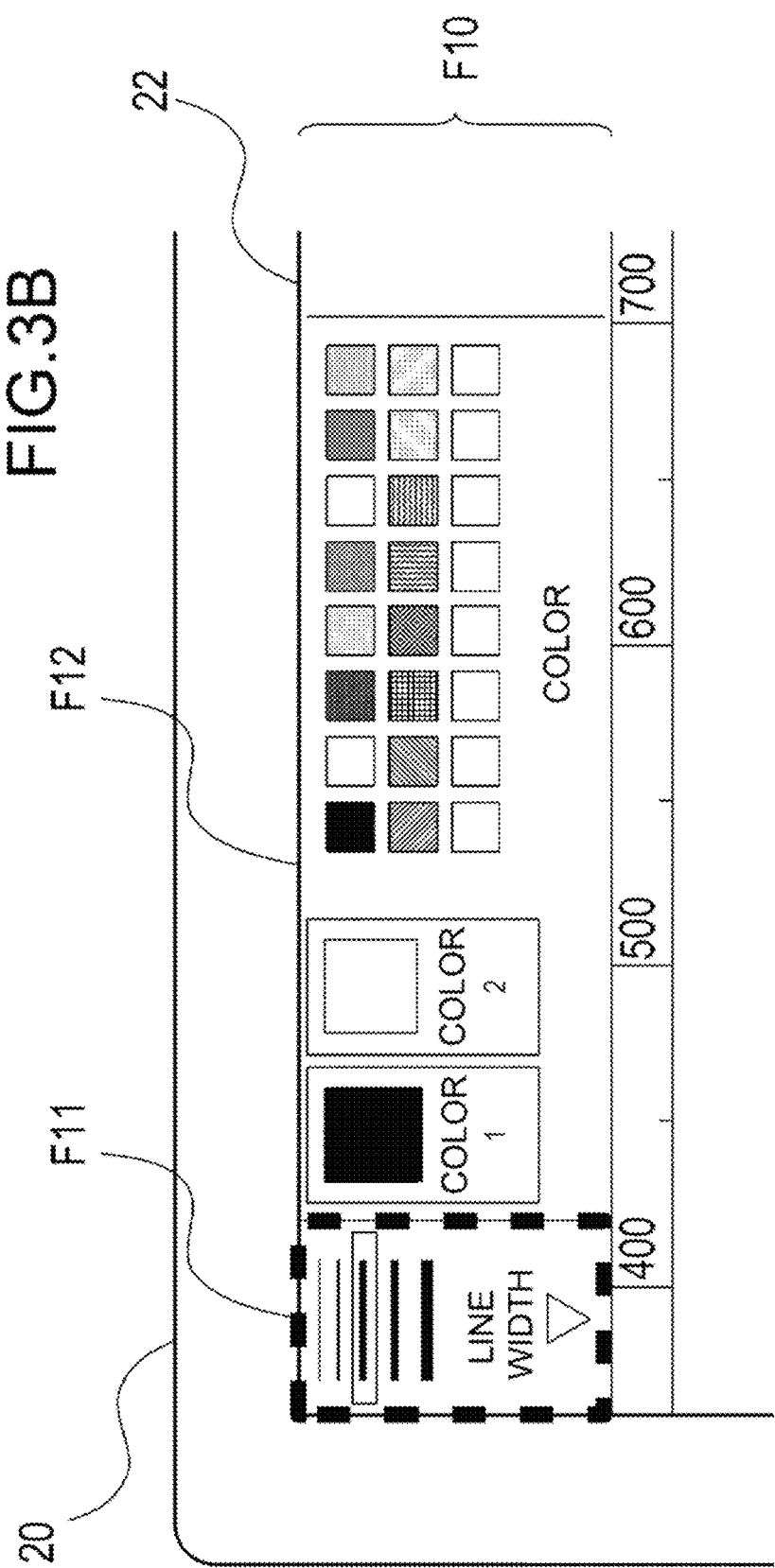

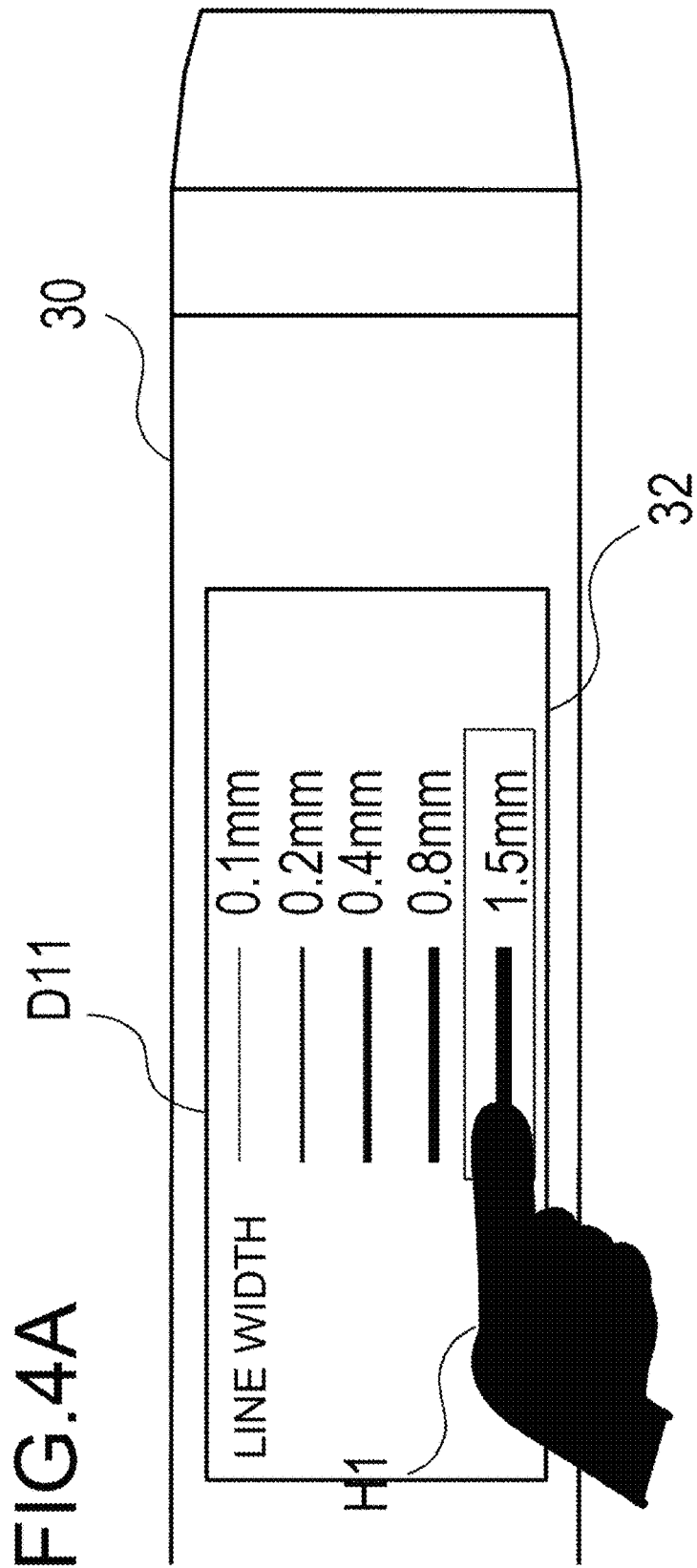

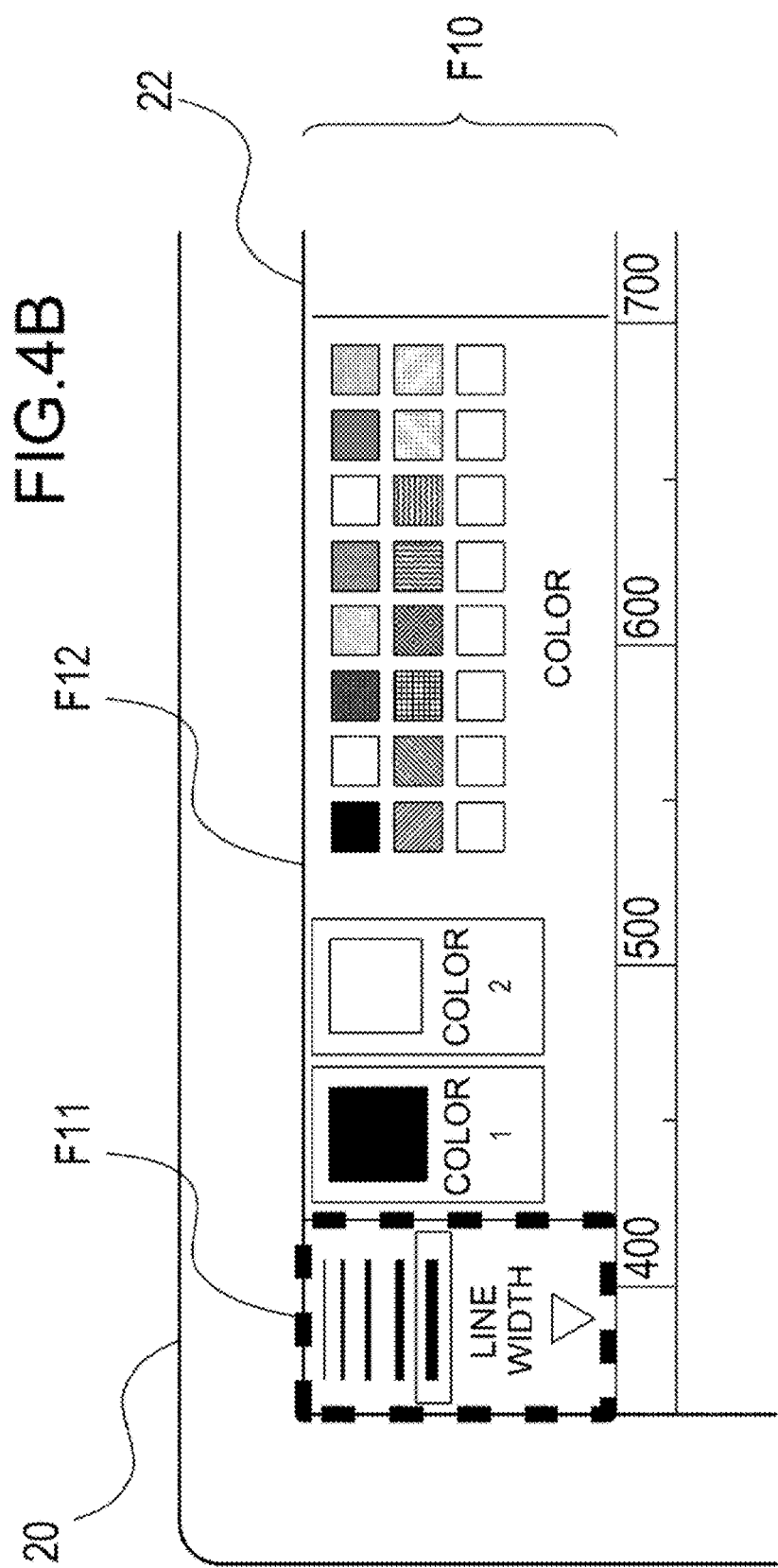

PEN-TYPE INPUT APPARATUS AND DISPLAY-INPUT SYSTEM

INCORPORATION BY REFERENCE

This application is based on and claims the benefit of priority from Japanese Patent Application No. 2017-014046 filed on Jan. 30, 2017, the contents of which are hereby incorporated by reference.

BACKGROUND

The present disclosure relates to a pen-type input apparatus and a display-input system; for example, relates to a pen-type input apparatus for inputting to a display apparatus such as a tablet and the like that has a touch panel, and to a display-input system that includes this kind of display apparatus and pen-type input apparatus.

As a method for inputting characters and illustrations to a display apparatus such as an electronic tablet (hereafter, referred to as simply a "tablet") and the like, there is technology that uses a pen for electronic equipment (hereafter, referred to simply as a "touch pen") as a pen-type input apparatus. In the input by a touch pen, technology is used that performs input after a font and font size are selected on a character-type-selection screen that is displayed on the tablet.

Technology is also proposed in which the color and thickness of character input is changed by operation using a physical portion (switch button) of the touch pen. In this typical technology, by bringing the touch pen in contact with the touch panel that is provided on the display apparatus, the pen tip is physically recognized and the line thickness is switched.

SUMMARY

The technology according to the present disclosure is pen-type input apparatus that performs input to a touch-panel-type display apparatus and includes a communication unit and a touch panel. The communication unit performs communication with the touch-panel-type display apparatus. The touch panel performs linked operation by communicating with the touch-panel-type display apparatus.

The technology according to the present disclosure is a display-input system that includes a touch-panel-type display apparatus and a pen-type input apparatus that performs input to the touch-panel-type display apparatus. The pen-type input apparatus includes a pen-side communication unit and a pen-side touch panel. The pen-side communication unit performs communication with the touch-panel-type display apparatus. The pen-side touch panel performs linked operation by communicating with the touch-panel-type display apparatus. The touch-panel-type display apparatus includes a display-apparatus-side communication unit that performs communication with the pen-type input apparatus.

BRIEF DESCRIPTION OF THE DRAWINGS

FIG. 2A is an enlarged diagram illustrating a pen-side input IF of a touch pen according to an embodiment.
FIG. 2B is an enlarged diagram illustrating a pen-side input IF of a touch pen according to an embodiment.
FIG. 3A is a diagram illustrating an example of linked operation of a tablet and touch pen according to an embodiment.
FIG. 3B is a diagram illustrating an example of linked operation of a tablet and touch pen according to an embodiment.
FIG. 4A is a diagram illustrating an example of linked operation of a tablet and touch pen according to an embodiment.
FIG. 4B is a diagram illustrating an example of linked operation of a tablet and touch pen according to an embodiment.

DETAILED DESCRIPTION

In the following, a form for embodying the technology according to the present disclosure (hereafter, referred to as an "embodiment") will be explained with reference to the drawings.

Figure 1:
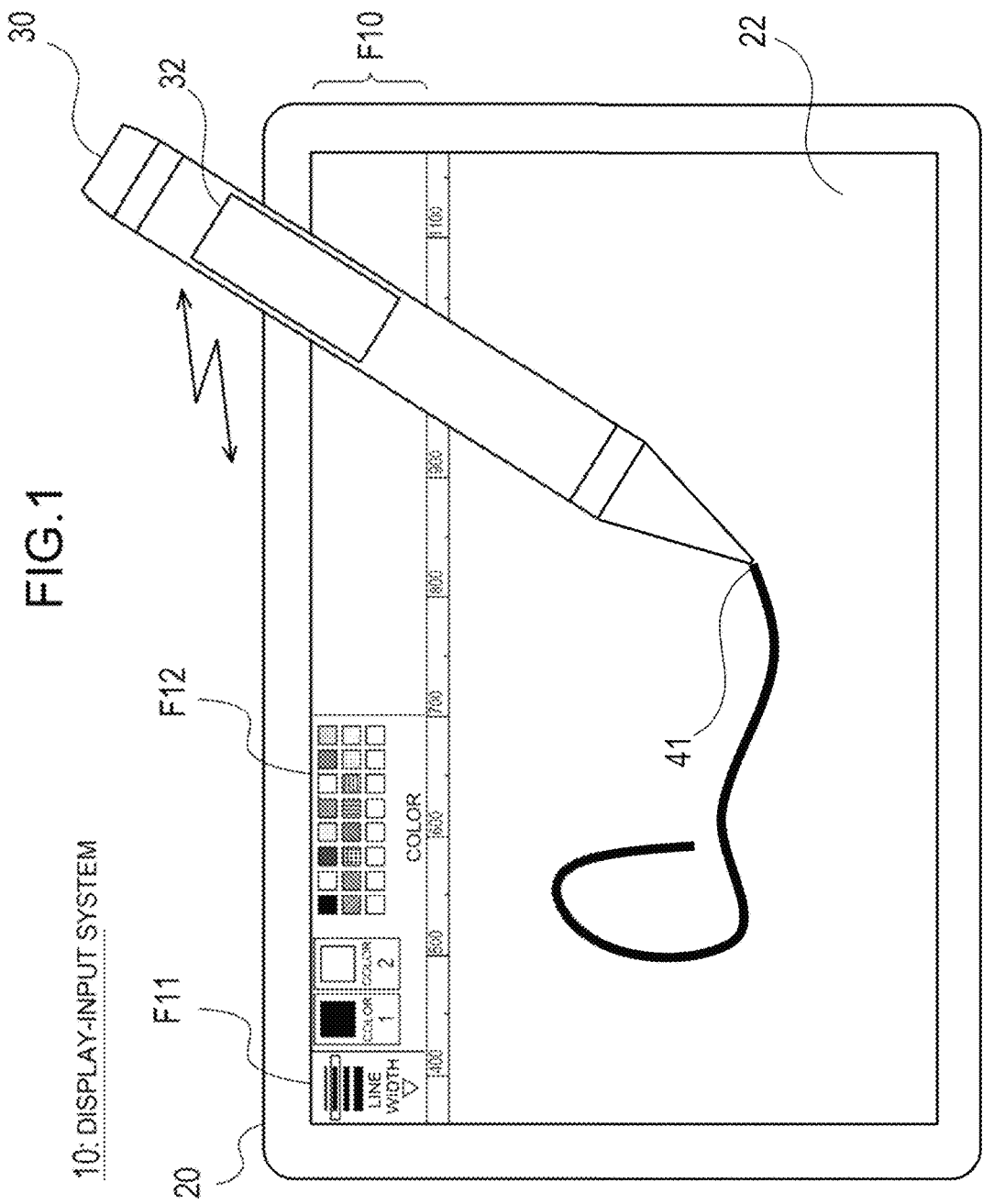
FIG. 1 is a diagram illustrating a display-input system according to an embodiment.

FIG. 1 is a diagram illustrating the configuration of a display-input system. The display-input system 10 includes a tablet 20 and a touch pen 30 as the input unit. The tablet 20 and the touch pen 30 are capable of linked operation by a communication unit described later.

The tablet 20 includes a display unit having a touch function that is a tablet-side input IF (hereafter, referred to as the "tablet-side touch panel 22"), and input by touch operation is possible. As illustrated in FIG. 1, in applications that are executed on the tablet 20, a palette F10 that specifies the input format is displayed in an upper area on the screen of the tablet-side touch panel 22. Here, a line type selection area F11 and line color selection area F12 are provided in the palette F10.

The touch pen 30 is a battery-driven self-static-generating pen, and has a liquid-crystal-display unit with a touch function that functions as a pen-operation-display unit (hereafter, referred to as the "pen-side touch panel 32"). It is possible for a user to use a finger for input of the tablet 20, however, by operating the pen tip 41 of this touch pen 30 to contact the tablet-side touch panel 22, it is possible to perform fine input in drawing and the like.

In typical input format specification, specification of a desired input format is performed by performing a touch operation of a desired area of the palette F10 using a finger or touch pen 30. In this embodiment, the same input format specification can be performed using the touch pen 30. In other words, the same contents (input-format-selection screen) as the palette F10 of the tablet 20 can be displayed on the pen-side touch panel 32 of the touch pen 30 so that selection is possible. The format that is selected by the user operating the pen-side touch panel 32 is reflected on the application that is executed on the tablet 20 in the same way as when operation is performed directly on the tablet 20.

FIG. 2A and FIG. 2B are enlarged diagrams illustrating the pen-side touch panel 32 of the touch pen 30. FIG. 2A illustrates an example in which a line-width-selection screen D11 is displayed on the pen-side touch panel 32. Line widths are displayed on the line-width-selection screen D11 in a display state that is the same (or similar) to the line-type-selection area F11 of the tablet-side touch panel 22 so that a desired line width can be selected. Here, a state is illustrated in which a line width of "0.4 mm" is selected. FIG. 2B illustrates an example in which a liner-colorselection screen D12 is displayed on the pen-side touch panel 32. Line colors are displayed on the line-color-selection screen D12 in a display state that is the same (or similar) to the line-color-selection area F12 of the tablet-side touch panel 22 so that a desired line color can be selected.

The user displays a desired input-format-selection screen (line-width-selection screen D11 or line-color-selection screen D12) by performing a swipe operation or the like on the pen-side touch panel 32, and by selecting a desired item from the displayed selection screen with a tap or the like, and sets the input format such as the line width, line color, line type, font and the like. On the pen-side touch panel 32 it is possible to enlarge or reduce the size of the display contents by an operation such as a pinch in, pinch out or the like.

FIG. 3A to FIG. 4B are diagrams illustrating linked operation of the tablet and touch pen. FIG. 3A and FIG. 3B illustrate a state before specifying the input format by the pen-side touch panel 32 of the touch pen 30, where FIG. 3A illustrates the display state of the pen-side touch panel 32 of the touch pen 30, and FIG. 3B illustrates the display state of the tablet 20.

The line-width-selection screen D11 is displayed on the pen-side touch panel 32, and is a state in which the third line width from the top of "0.4 mm" is selected. It is also a state in which the third line width from the top in the line-type-selection area F11 of the tablet-side touch panel 22 is selected. After this, the user's hand H1 touches the very bottom line width of "1.5 mm".

FIG. 4A and FIG. 4B illustrate the state after specifying the input format by the pen-side touch panel 32 of the touch pen 30, where FIG. 4A illustrates the display state of the pen-side touch panel 32 of the touch pen 30, and FIG. 4B illustrates the display state of the tablet 20.

When the user's hand H1 touches and selects the very bottom line width of "1.5 mm" that is displayed on the line-width-selection screen D11, the state of the line-width-selection area F11 of the tablet 20 is linked operation with that selection and transitions to a state in which the very bottom line width is selected.

Figure 5:
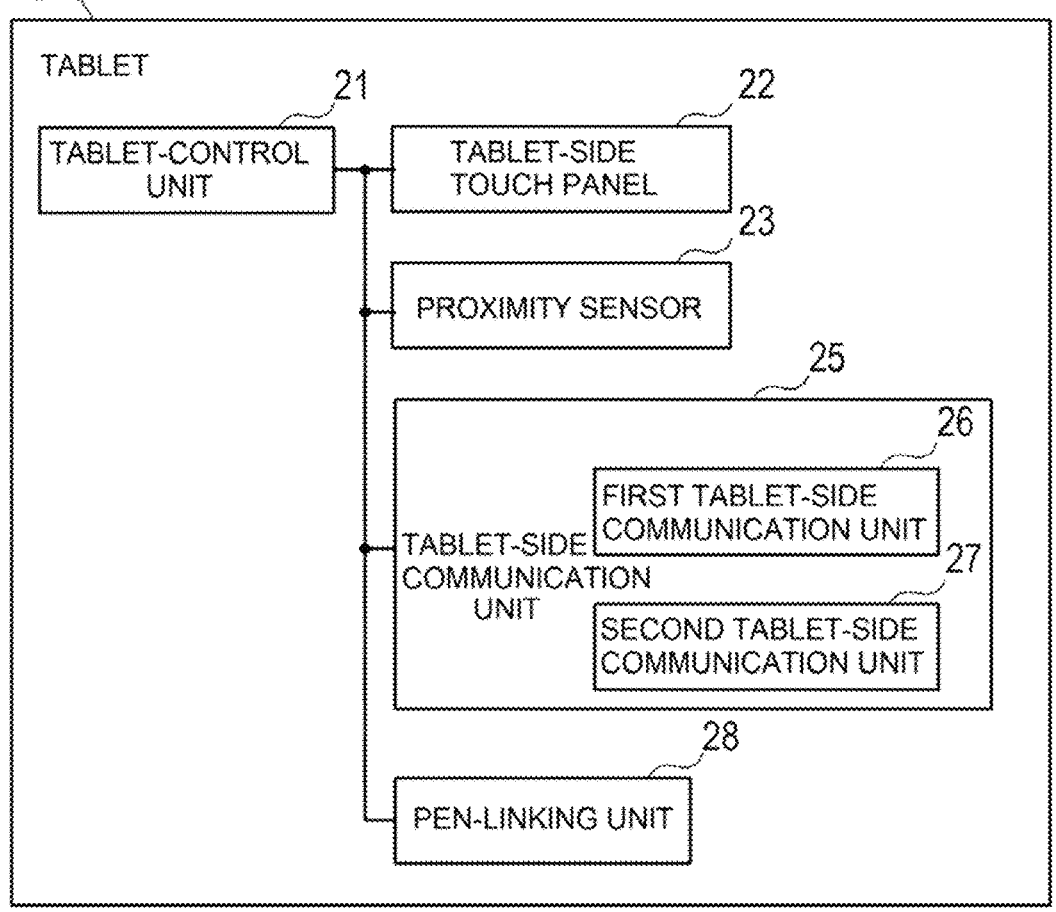
FIG. 5 is a block diagram illustrating an overview of the configuration of a tablet according to an embodiment.

The detailed configuration for executing the processing described above will be explained. FIG. 5 is a functional block diagram of the tablet 20. Here, the linked operation with the touch pen 30 is focused on and illustrated, and explanations of typical tablet functions are omitted as appropriate.

The tablet 20 includes a tablet-control unit 21, a tablet-side touch panel 22, a proximity sensor 23, a tablet-side-communication unit 25 and a pen-linking unit 28.

The tablet-control unit 21 comprehensively controls each of the components of the tablet 20. The tablet-side touch panel 22 is a panel in which a touch function and liquid-crystal display function are integrally configured. The proximity sensor 23 is arranged, for example, in the frame portion, and detects the proximity of the user's body and the proximity of an object such as the touch pen 30 and the like.

The tablet-side-communication unit 25 includes a first tablet-side-communication unit 26 and a second tablet-side-communication unit 27. The first tablet-side-communication 26 performs communication with the first pen-side-communication unit 36 (refer to FIG. 6) of the touch pen 30 according to a short-range wireless communication standard such as Bluetooth (registered trademark) or the like. The second tablet-side-communication unit 27 performs communication with the second pen-side-communication unit 37 (refer to FIG. 6) of the touch pen 30 according to a short-range wireless communication standard such as NFC (Near Field Communication) or the like. In other words, communication between the second tablet-side-communication unit 27 and the second pen-side-communication unit 37 is set so that communication becomes possible when the tablet 20 and the touch pen 30 are separated by a very close distance, for example, a distance of about several cm to tens of cm.

The pen-linking unit 28 (pen-linking-control unit), by communicating with the touch pen 30 using the tablet-side-communication unit 25, executes and controls linked operation with the touch pen 30. The detailed operation of the pen-linking unit 28 will be described later.

Figure 6:
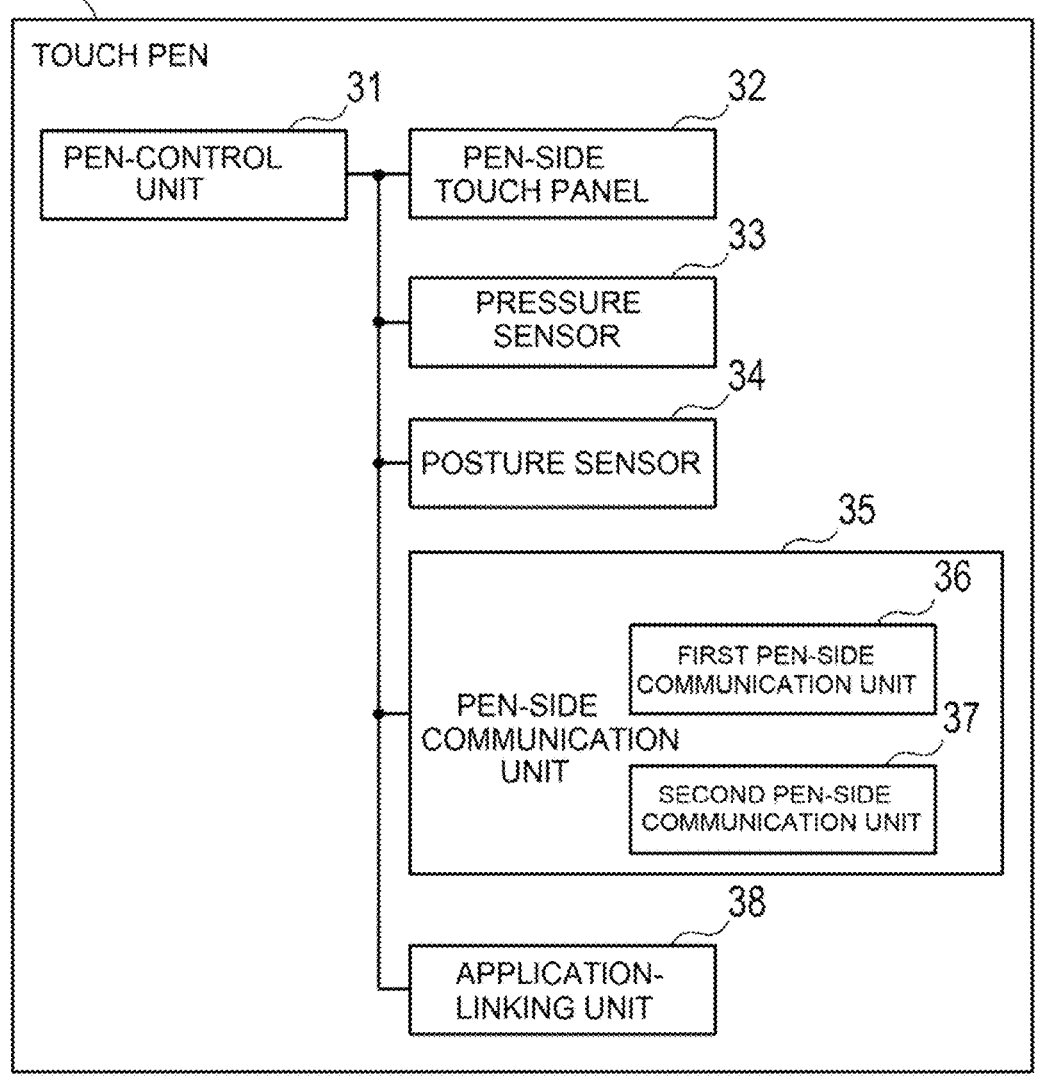
FIG. 6 is a block diagram illustrating an overview of the configuration of a touch pen according to an embodiment.

FIG. 6 is a functional block diagram of the touch pen 30. Here, the linked operation with the tablet 20 is focused on and illustrated, and explanations of typical pen functions are omitted as appropriate.

The touch pen 30 includes a pen-control unit 31, a pen-side touch panel 32, a pressure sensor 33 (physical switch), a posture sensor 34, a pen-side-communication unit 35, and an application-linking unit 38.

The pen-control unit 31 comprehensively controls each of the components of the touch pen 30. The pen-side touch panel 32 is a panel in which a touch function and liquid-crystal display function are integrally configured.

The pressure sensor 33, for example, is s switch that is arranged in (or near) the grip portion. The user activates the pen-side touch panel 32 by grasping and pressing this pressure sensor 33. Moreover, when the user presses the pressure sensor 33 when the pen-side touch panel 32 is in an activated state, the pen-side touch panel 32 is switched to a stopped state. Furthermore, plural pressure sensors 33 may be arranged, and depending on the pressed state, the operated functions differ. For example, when activating the pen-side touch panel 32, there is a setting of simultaneously pressing two pressure sensors.

The posture sensor 34 detects the movement and posture of the touch pen 30 by detecting the three-dimensional posture angle, and the acceleration in three-dimensional directions. For example, based on the detection results by the posture sensor 34, the application-linking unit 38 described later is able to determine whether or not the touch pen 30 is in a state of being used.

When a similar posture sensor is mounted in the tablet 20, it is possible to determine the operating state in more detail from the information from that posture sensor and from the information from the proximity sensor 23 of the tablet 20 and the posture sensor 34 of the touch pen 30. For example, when the angle between the tablet 20 and the touch pen 30 is in the range 90°±α, and the distance between the tablet 20 and the touch pen 30 is shortened, it can be determined that there is a high possibility that pen input will start. In other words, it is possible to determine with good accuracy the activating and stopping operation of the pen-side touch panel 32 of the touch pen 30, and whether or not to display the line-selection area F11 on the tablet 20.

The pen-side-communication unit 35 includes a first pen-side-communication unit 36 and a second pen-side-communication unit 37. The first pen-side-communication unit 36 performs communication with the first tablet-side-communication unit 26 of the tablet 20 according to a short-range wireless communication standard such as Bluetooth (registered trademark) or the like. The second pen-side-communication unit 37 performs communication with the second tablet-side-communication unit 27 of the tablet 20 according to a short-range wireless communication standard such as NFC or the like.

The application-linking unit 38 (application-linking-control unit) performs linked operation with an application that is executed by the tablet 20, and controls the operation of the tablet-side touch panel 22 and communication with the tablet 20. The operation of the application-linking unit 38 will be summarized and explained below.

In the following, the operation of the pen-linking unit 28 and the application-linking unit 38 will be summarized and explained. As the operation at the time of activating or stopping the tablet-side touch panel 22, the application-linking unit 38, as described above, detects when the pressure sensor 33 that is provided in the grip portion is pressed, and activates or stops the tablet-side touch panel 22.

After the tablet-side touch panel 22 is activated, the application-linking unit 38 communicates with the tablet 20 using the first pen-side-communication unit 36, and determines whether or not an application that is linked operation with the touch pen 30 is being executed by the tablet. In other words, the application-linking unit 38 determines whether or not the touch pen 30 is in a state of being able to execute a function for performing input format specification (line width, line color, line type and the like) in the application of the tablet 20. When the touch pen 30 is in such an executable state, the application-linking unit 38 displays an input format specification screen on the pen-side touch panel 32.

The pen-linking unit 28 of the tablet 20, by communicating with the touch pen 30, grasps the operating state of the touch pen 30, or in other words the display state or the like of the pen-side touch panel 32. When the input-format-selection screen (line-width-selection screen D11, line-color-selection screen D12) is displayed on the touch panel 32 of the touch pen 30, the pen-linking unit 28 does not need to cause the palette F10 that is displayed on the tablet-side touch panel 22 to be displayed. This is because the pen-side touch panel 32 of the touch pen 30 is in a state in which it is possible to change the line width, line color, line type and the like. As a result, the actual area of the tablet-side touch panel 22 in which input is possible is enlarged.

When a specified area such as the upper right corner of the tablet-side touch panel 22 is touched when the palette F10 is in a no-display state, the display state of the palette F10 may be restored. Moreover, restoring the display state may also be specified by a specific operation of the pressure sensor 33 or the like of the touch pen 30.

When input using the touch pen 30 is detected, or when it is possible to determine that the distance between the tablet 20 and touch pen 30 is close, the pen-linking unit 28 of the tablet 20 may set the state to a locked state in which specification of the input format on the pen-side touch panel 32 is prohibited. This makes it possible to avoid erroneous operation of the pen-side touch panel 32 when there is a high possibility of a state during pen input (during an input operation of bringing the pen tip 41 of the touch pen 30 in contact with the tablet-side touch panel 22 or the like), or when coming close in order to perform input.

A close distance between the tablet 20 and the touch pen 30 can be determined by NFC communication between the second tablet-side-communication unit 27 and second pen-side-communication unit 37. Moreover, the distance when prohibiting specification of the input format can be adjusted by the signal strength during NFC communication. Furthermore, control for maintaining a locked state for a specified time after the end of pen input, for example, 3 seconds, is also possible.

Moreover, the application-linking unit 38 is also able to detect the start and end of pen input from the detection results of the posture sensor 34; and during pen input, the application-linking unit 38 is able perform control of moving the power supply to the pen-side touch panel 32 to an power-saving state, and when pen input ends, moving to the normal power state.

Furthermore, when the amount of charge of the battery of the touch pen 30 is below a specified amount in a state in which the palette F10 is not displayed on the tablet-side touch panel 22 of the tablet 20, the application-linking unit 38 may move to a power-saving state that lowers the brightness of the pen-side touch panel 32, or to a no-display state. In this case, the pen-linking unit 28 of the tablet 20 causes the palette F10 to be displayed on the tablet-side touch panel 22 of the tablet 20.

The present disclosure was explained above based on an embodiment. This embodiment is an example, and those skilled in the art will understand that various modifications are possible for the combinations of each of the components, and that the modifications are also within the range of the present disclosure. For example, a tablet was presented as an example of a display apparatus that receives input from a touch pen 30, however, the embodiment is not limited to this, and, for example, the display apparatus may be a display apparatus having a touch panel, such as a smart phone, PC with a keyboard, and the like.

Incidentally, a desired character type is selected from among many character types on the character-type-selection screen that is displayed on the tablet, so there is a problem of this being troublesome. Moreover, in typical technology described above, by bringing the touch pen in contact with the touch panel that is provided on a display apparatus, the pen tip is physically recognized, and the thickness of the line is switched, however, operation of a physical portion is used, so there is a problem in that the number of selected items is limited.

With the technology according to the present disclosure, it is possible to provide technology in which it is easier to specify the format and the like when inputting to a display apparatus such as a tablet or the like that uses a pen-type input apparatus.

What is claimed is:

1. A pen-type input apparatus that performs input to a display apparatus comprising a first touch panel, the pen-type input apparatus comprising:
    a communication unit that performs communication with the display apparatus;
    a second touch panel that performs linked operation by communicating with the display apparatus; and
    an application-linking-control unit that performs control so that a screen for specifying input format of an application that is executed by the display apparatus is displayed on the second touch panel;
    wherein
    the application-linking-control unit, when the distance from the pen-type input apparatus to the display apparatus is close, prohibits input to the second touch panel; and
    the pen-type input apparatus further comprise a posture sensor that, in cooperation with a posture sensor of the display apparatus, detects an angle of the pen-type input apparatus relative to the display apparatus, wherein said prohibition of input to the second touch panel further requires that said relative angle is within a specified range.

2. The pen-type input apparatus according to claim 1, wherein
    the application-linking-control unit controls a supply of power to the second touch panel according to a charged amount of a battery.

3. A display-input system comprising:
a display apparatus comprising a first touch panel; and
a pen-type input apparatus that performs input to the display apparatus; wherein
the pen-type input apparatus comprises:
a pen-side communication unit that performs communication with the display apparatus; and
a second touch panel that performs linked operation by communicating with the display apparatus;
the display apparatus comprises a display-apparatus-side communication unit that performs communication with the pen-type input apparatus;
the pen-type input apparatus comprises an application-linking-control unit that, together with performing control so that a screen for specifying the input format of an application that is executed by the display apparatus is displayed on the second touch panel, notifies the display apparatus of the operation contents to the second touch panel;
the display apparatus comprises a pen-linking-control unit that reflects a notification from the pen-type input apparatus on operation of an application that is being executed;
the application-linking-control unit, when the distance from the pen-type input apparatus to the display apparatus is close, prohibits input to the second touch panel;
the pen-type input apparatus comprises a first posture sensor;
the display apparatus comprises a second posture sensor; and
the first posture sensor and the second posture sensor detect an angle of the pen-type input apparatus relative to the display apparatus, wherein said prohibition of input to the second touch panel further requires that said relative angle is within a specified range.

4. The display-input system according to claim 3, wherein the application-linking-control unit controls a supply of power to the second touch panel according to a charged amount of a battery.

5. The display-input system according to claim 3, wherein when a screen for specifying an input format is displayed on the second touch panel, the pen-linking-control unit does not cause an area for specifying the input format to be displayed.

6. The display-input system according to claim 3, wherein when a screen for specifying an input format is not displayed on the second touch panel, the pen-linking-control unit causes an area for specifying the input format to be displayed.

* * * * *